Feb. 13, 1923.

P. SPALECK.

APPARATUS FOR COOKING CLOTHES, JAM, ETC., FOR STEAMING FOOD AND SO ON.
FILED SEPT. 8, 1920.

1,445,244.

Paul Spaleck

Patented Feb. 13, 1923.

1,445,244

UNITED STATES PATENT OFFICE.

PAUL SPALECK, OF DESSAU, GERMANY, ASSIGNOR TO HUGO JUNKERS, OF DESSAU, GERMANY.

APPARATUS FOR COOKING CLOTHES, JAM, ETC., FOR STEAMING FOOD AND SO ON.

Application filed September 8, 1920. Serial No. 409,501.

*To all whom it may concern:*

Be it known that I, PAUL SPALECK, a citizen of the German Empire, residing at Dessau, Anhalt, Germany, have invented certain new and useful Improvements in Apparatus for Cooking Clothes, Jam, etc., for Steaming Food and so on, of which the following is a specification.

This invention relates to portable boilers or kettles for boiling, cooking or steaming purposes.

According to the invention the boiler or like vessel is connected by heat conducting webs to an inner metal jacket which only partially covers the vessel, so that hot gases can circulate freely between the vessel and the jacket. An outer protective or decorative jacket or casing is provided enclosing the inner jacket, and suitably spaced therefrom, and also having an exit flue for the hot gases. The heating means are arranged below the inner jacket as usual.

With this construction the hot gases rise in the space between the inner jacket and the vessel thereby delivering their heat partly directly to the walls of the vessel, partly to the said jacket and to the webs connecting the jacket to the vessel. The heat, however, is not stored up in these latter parts as in a wall of fireproof bricks for example, but it flows, by means of the heat conducting connection of these parts, to the walls of the vessel. In consequence thereof the temperature of the jacket cannot rise excessively, but is only slightly higher in temperature than the walls of the vessel, thus considerable heat losses caused by radiation and premature destruction of material by excessive heating are eliminated.

The drawings show two examples of the improved apparatus.

Figure 1:
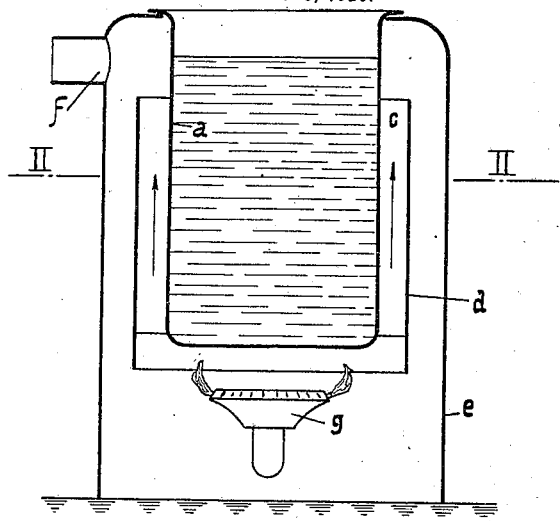
Fig. 1 is a sectional elevation of one form of the apparatus.
Figure 2:
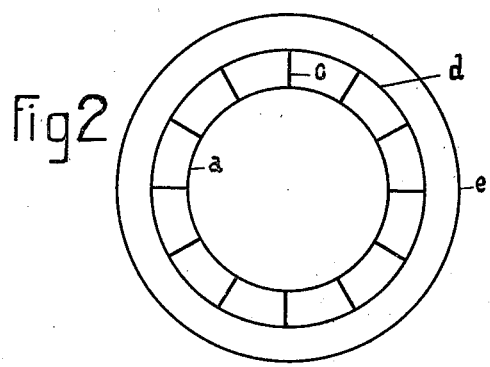
Fig. 2 is a sectional plan view on the line II—II Fig. 1.

In the apparatus, shown in Figs. 1 and 2, $a$ is the wall of the vessel, $c$ are the webs connecting the inner jacket $d$ in a heat conducting manner to the wall $a$. The vessel $a$ together with the jacket $d$ is placed in an outer jacket or casing $e$, having an outlet $f$ for the waste gases. The apparatus may be adapted for use with any desired form of heating such as gaseous, liquid or solid fuels. The example shows a burner $g$ for gas heating.

Figure 3:
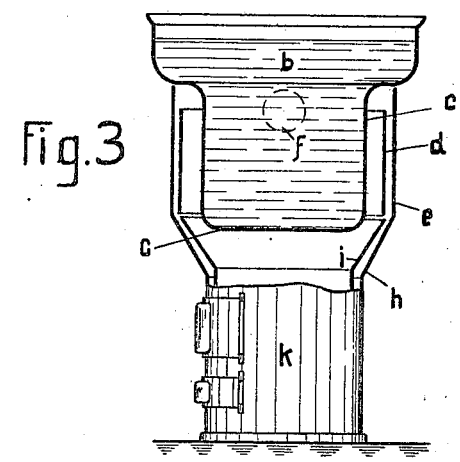
Fig. 3 is a view partly in section of a modified form of the apparatus.

The arrangement may be further improved by contracting the water space of the vessel in its lower part, as shown in Fig. 3. The jacket $d$ here only surrounds the contracted part $a$ of the vessel. The upper part $b$ is somewhat wider than the jacket $e$ and extends beyond same. The webs $c$ and the jacket $d$ do not extend right up to the extension $b$, in order to provide a free passage for the waste gases. The vessel together with its jacket is placed in a protecting and decorative outer jacket $e$ and rests with the extension $b$ on the upper edge of the said outer jacket. In the upper part of the protecting jacket $e$ the flue pipe $f$ is arranged. With a kettle of this construction the upper part is out of the range of the fire and cannot become overheated. It is thus possible to use the kettle with a small amount of water therein for instance as an apparatus for evaporating juice.

Since the jacket $d$ protects the outer projecting jacket $e$ only for the depth of the vessel, the fireplace $k$ is made of smaller diameter than the vessel $b$ and the jacket $e$, thereby still further diminishing the danger of touching the hot walls of the outer jacket. The joining of the wider protecting jacket $e$ to the narrower fire-place $k$ is effected by means of a conical connecting piece $h$. The inner funnel $i$ leads the hot gases to the space between vessel $a$ and jacket $d$. By such an arrangement of the device the person tending the kettle is less inconvenienced by the heat of the fireplace, and less liable to touch same with his clothes.

I claim:—

1. An apparatus for cooking clothes, jam, etc., for steaming food and so on, comprising a vessel, a firing device below said vessel, a metallic jacket surrounding the vessel round its whole circumstance at a certain distance, said jacket being connected to the vessel in a heat-conducting manner by means of connecting members or webs, distributed at certain distances round the entire circumference of the said vessel and jacket, the space between said jacket and the vessel forming a funnel for the heating gases.

2. An apparatus for cooking clothes, jam, etc., for steaming food and so on, comprising a vessel, a firing device below said vessel, a metallic jacket surrounding the vessel round its whole circumference at a certain distance, said jacket being connected to the vessel in a heat-conducting manner by means of connecting members or webs, distributed at certain distances round the entire circumference of the said vessel and jacket, the space between said jacket and the vessel forming a funnel for the heating gases, and a protecting casing enclosing the vessel and the jacket connected to the vessel and fitted with a flue at its upper part, so as to receive the waste gases immediately from the said funnel.

3. An apparatus for cooking clothes, jam, etc., for steaming food and so on, comprising a vessel contracted in its lower part, a firing device below said vessel, a metallic jacket surrounding the contracted part of the vessel at a certain distance, said jacket connected to the vessel in a heat-conducting manner by means of connecting members or webs, the space between said jacket and the vessel forming a funnel for the heating gases.

4. An apparatus for cooking clothes, jam, etc., for steaming food and so on, comprising a vessel contracted in its lower part, a firing device below said vessel, a metallic jacket surrounding the contracted part of the vessel at a certain distance, said jacket connected to the vessel in a heat-conducting manner by means of connecting members or webs, the space between said jacket and the vessel forming a funnel for the heating gases and a protecting casing, narrower than the widest part of the vessel and supporting the vessel.

5. An apparatus for cooking clothes, jam, etc., for steaming food and so on, comprising a vessel, a firing device below said vessel, a metallic jacket surrounding the vessel at a certain distance, said jacket connected to the vessel in a heat-conducting manner by means of connecting members or webs, the space between said jacket and the vessel forming a funnel for the heating gases, and a protecting casing enclosing the vessel and the jacket connected to the vessel and fitted with an issue for the waste gases, contracted on its lower part enclosing the fire-place.

6. An apparatus for cooking clothes, jam, etc., for steaming food and so on, comprising a vessel, a firing device below said vessel, a metallic jacket surrounding the vessel at a certain distance, said jacket being connected to the vessel in a heat-conducting manner by means of connecting members or webs, the space between said mantle and the vessel forming a funnel for the heating gases, a protecting casing enclosing the vessel and the jacket connected to the vessel and fitted with an issue for the waste gases, contracted on its lower part enclosing the fire place, and an inner funnel arranged in the lower part of the protecting casing and adapted to lead the heating gases into the space between the vessel and the jacket connected to the vessel.

In testimony whereof I affix my signature in presence of two witnesses.

PAUL SPALECK.

Witnesses:
LUDWIG WAGENSEIL,
FRIEDA STEINBRINCK.